United States Patent
Rayner et al.

(10) Patent No.: US 12,179,919 B2
(45) Date of Patent: Dec. 31, 2024

(54) SLAT MOVEMENT SYSTEM FOR AIRCRAFT

(71) Applicant: The Boeing Company, Arlington, VA (US)

(72) Inventors: Emily Georgia Rayner, Newport (AU); Kevin Raylin Tsai, Redmond, WA (US); Ramón Augustin Burin, Lake Stevens, WA (US); Bret Alan Bowers, Langley, WA (US)

(73) Assignee: The Boeing Company, Arlington, VA (US)

( * ) Notice: Subject to any disclaimer, the term of this patent is extended or adjusted under 35 U.S.C. 154(b) by 61 days.

(21) Appl. No.: 18/299,491

(22) Filed: Apr. 12, 2023

(65) Prior Publication Data

US 2024/0343383 A1    Oct. 17, 2024

(51) Int. Cl.
*B64C 9/24* (2006.01)
*B64C 9/02* (2006.01)
*B64C 9/06* (2006.01)
*B64C 13/38* (2006.01)

(52) U.S. Cl.
CPC .................. *B64C 9/24* (2013.01); *B64C 9/02* (2013.01); *B64C 9/06* (2013.01); *B64C 13/38* (2013.01)

(58) Field of Classification Search
CPC .... B64C 9/24; B64C 9/02; B64C 9/06; B64C 13/38
See application file for complete search history.

(56) References Cited

U.S. PATENT DOCUMENTS

| | | | | |
|---|---|---|---|---|
| 1,780,838 A * | 11/1930 | Page | ........................ | B64C 9/24 244/210 |
| 2,000,666 A * | 5/1935 | Osborn | ..................... | B64C 9/24 244/90 R |
| 3,743,219 A * | 7/1973 | Gorges | ...................... | B64C 9/24 244/210 |
| 3,847,369 A * | 11/1974 | Phillips | ..................... | B64C 9/24 244/210 |
| 3,994,452 A * | 11/1976 | Cole | ........................ | B64C 3/48 244/214 |
| 4,202,519 A * | 5/1980 | Fletcher | .................... | B64C 9/24 244/210 |
| 4,285,482 A * | 8/1981 | Lewis | ........................ | B64C 9/24 244/210 |
| 4,351,502 A * | 9/1982 | Statkus | ..................... | B64C 3/48 244/214 |

(Continued)

FOREIGN PATENT DOCUMENTS

CN    113212734 A    8/2021

OTHER PUBLICATIONS

Sahin et al., "Design and Analysis of a Novel Mechanism for the Morphing of Trailing Edge of an Aircraft Wing," 5th International Conference of Engineering Against Failure (ICEAF-V 2018), MATEC Web of Conferences, vol. 188, Aug. 7, 2018, 9 pages. https://doi.org/10.1051/matecconf/201818804001.

*Primary Examiner* — Medhat Badawi
(74) *Attorney, Agent, or Firm* — Yee & Associates, P.C.

(57) ABSTRACT

The illustrative examples provide a slat movement system for use in an aircraft. An aircraft comprises a wing having a fixed edge and a wing front spar, and a moveable slat connected to the wing by a four bar linkage and a slat arm, the slat arm movable along a track comprising a slot terminating prior to the wing front spar.

22 Claims, 13 Drawing Sheets

(56) References Cited

U.S. PATENT DOCUMENTS

| | | | | |
|---|---|---|---|---|
| 4,399,970 | A * | 8/1983 | Evans | B64C 9/24 |
| | | | | 244/99.3 |
| 4,427,168 | A * | 1/1984 | McKinney | B64C 3/48 |
| | | | | 244/214 |
| 4,650,140 | A * | 3/1987 | Cole | B64C 9/24 |
| | | | | 244/214 |
| 4,915,327 | A * | 4/1990 | Ellmers | B64C 13/30 |
| | | | | 244/210 |
| 7,270,305 | B2 * | 9/2007 | Rampton | B64C 9/22 |
| | | | | 244/214 |
| 7,578,484 | B2 * | 8/2009 | Fox | B64C 9/22 |
| | | | | 244/214 |
| 8,226,048 | B2 * | 7/2012 | Beyer | B64C 9/24 |
| | | | | 244/214 |
| 8,245,982 | B2 * | 8/2012 | Vormezeele | B64C 9/22 |
| | | | | 244/214 |
| 8,286,921 | B2 * | 10/2012 | Heller | B64C 9/22 |
| | | | | 244/214 |
| 8,302,914 | B2 * | 11/2012 | Zeumer | B64C 9/18 |
| | | | | 244/215 |
| 9,016,637 | B2 * | 4/2015 | Sakurai | B64C 9/24 |
| | | | | 244/99.3 |
| 9,334,043 | B2 * | 5/2016 | Schlipf | B64C 9/22 |
| 9,415,856 | B2 * | 8/2016 | Rawdon | B64C 3/48 |
| 9,598,167 | B2 * | 3/2017 | Grip | B64C 3/26 |
| 9,688,386 | B2 * | 6/2017 | Sakurai | B64C 9/24 |
| 10,589,839 | B2 * | 3/2020 | Schlipf | B64C 9/24 |
| 10,618,644 | B2 * | 4/2020 | Gemilang | B64C 9/26 |
| 10,633,078 | B2 * | 4/2020 | Kordel | B64C 9/323 |
| 11,034,434 | B2 * | 6/2021 | Stecher | B64C 9/22 |
| 11,235,854 | B2 * | 2/2022 | de Queiroz | B64C 9/34 |
| 11,560,214 | B2 * | 1/2023 | Tsai | B64C 13/32 |
| 11,873,096 | B1 * | 1/2024 | Spring | B64C 11/20 |
| 12,054,258 | B2 * | 8/2024 | Daandels | B64C 9/02 |
| 2007/0034747 | A1 * | 2/2007 | Amorosi | B64C 9/22 |
| | | | | 244/99.2 |
| 2010/0084515 | A1 * | 4/2010 | Jaggard | B64C 9/22 |
| | | | | 244/214 |
| 2010/0187368 | A1 * | 7/2010 | Cathelain | B64C 9/24 |
| | | | | 244/214 |
| 2017/0073082 | A1 * | 3/2017 | Ungar | B64C 9/22 |
| 2019/0061912 | A1 * | 2/2019 | Stecher | B64C 9/22 |
| 2019/0176962 | A1 * | 6/2019 | Kordel | B64C 9/20 |
| 2020/0023937 | A1 * | 1/2020 | Everaert | B64C 5/10 |
| 2020/0047874 | A1 * | 2/2020 | Bowers | F15B 15/06 |
| 2021/0403140 | A1 * | 12/2021 | Peterson | B64C 7/00 |
| 2022/0081102 | A1 * | 3/2022 | Tsai | B64C 13/32 |
| 2023/0002033 | A1 * | 1/2023 | Schlipf | F16C 19/38 |
| 2023/0064922 | A1 * | 3/2023 | Bensmann | B64C 3/28 |
| 2023/0249804 | A1 * | 8/2023 | Tsai | B64C 9/18 |
| | | | | 244/131 |
| 2023/0382515 | A1 * | 11/2023 | Tsai | B64C 9/06 |
| 2024/0017819 | A1 * | 1/2024 | Tsai | B64C 9/02 |

\* cited by examiner

SLAT MOVEMENT SYSTEM FOR AIRCRAFT

BACKGROUND INFORMATION

1. Field

The present disclosure relates generally to a moveable slat of an aircraft wing and more specifically to a slat movement system for moving a slat of a wing.

2. Background

Modern aircrafts often use slat devices on the leading edge of the wing to modify the wing's effective chord and camber. This improves airplane performance during takeoff and landing without penalizing the cruise performance.

For the slat to be effective, the slat often utilizes a trajectory that is a large distance. This in turn results in long tracks which penetrate the front spar of the wing.

Therefore, it would be desirable to have a method and apparatus that takes into account at least some of the issues discussed above, as well as other possible issues.

SUMMARY

An embodiment of the present disclosure provides an aircraft. The aircraft comprises a wing having a fixed edge and a wing front spar, and a moveable slat connected to the wing by a four bar linkage and a slat arm, the slat arm movable along a track comprising a slot terminating prior to the wing front spar.

Another embodiment of the present disclosure provides a slat movement system for a wing of an aircraft. The slat movement system comprises a four bar linkage connected to a slat and to a set of ribs, a track comprising a slot contained between a fixed edge of the wing and a wing front spar in the wing, and a slat arm movably connected to the track by a roller within the slot.

Yet another embodiment of the present disclosure provides a wing of an aircraft. The wing comprises a fixed edge, a frame of the wing comprising a number of ribs and a wing front spar, a slat movable relative to the fixed edge, a plurality of four bar linkages connecting the slat to the frame of the wing, and a plurality of slat arms connected to the slat, each of the plurality of slat arms attached by a roller to a respective track having a complex curvature, each track connected to the frame, each track terminating prior to the wing front spar.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. For example, the illustrative examples recognize and take into account that conventional solutions utilize long tracks which create penetrations in the wing front spar. The illustrative examples recognize and take into account the wing front spar can be part of a fuel storage tank. The illustrative examples recognize and take into account that cans to seal the fuel tank are utilized when penetrations are cut into the wing front spar. The illustrative examples recognize and take into account that these cans drive additional cost, weight, assembly, and maintenance time.

Figure 1:
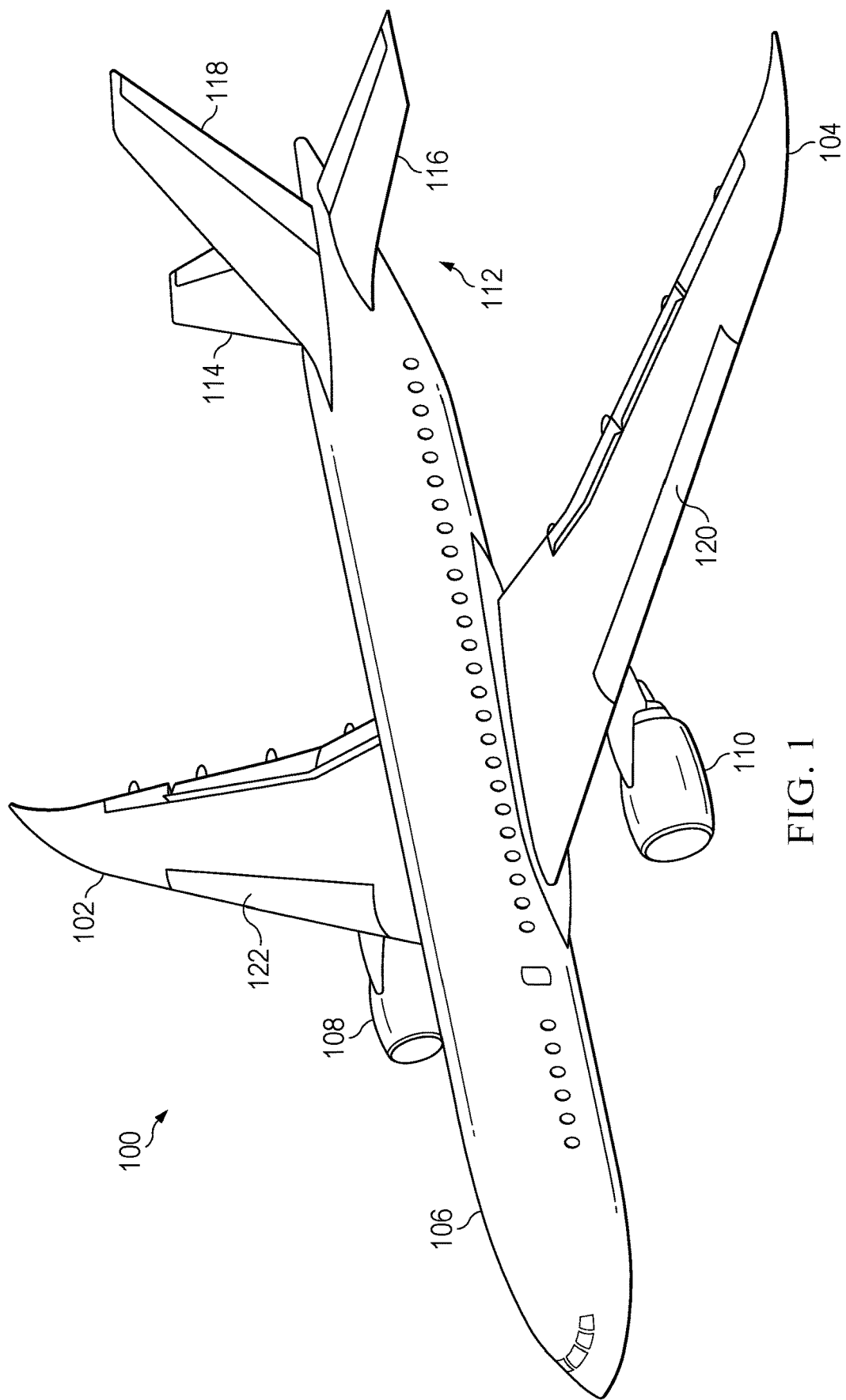
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have slat movement systems provided by the illustrative examples. Aircraft 100 is an example of an aircraft with movable slats controlled by four bar linkages with slat arms connected to tracks terminating prior to a front wing spar. For example, slat 120 of wing 104 can be controlled by four bar linkages and slat arms connected to tracks terminating prior to a front wing spar of wing 104. As another example, slat 122 of wing 102 can be controlled by four bar linkages and slat arms connected to tracks terminating prior to a front wing spar of wing 102.

Figure 2:
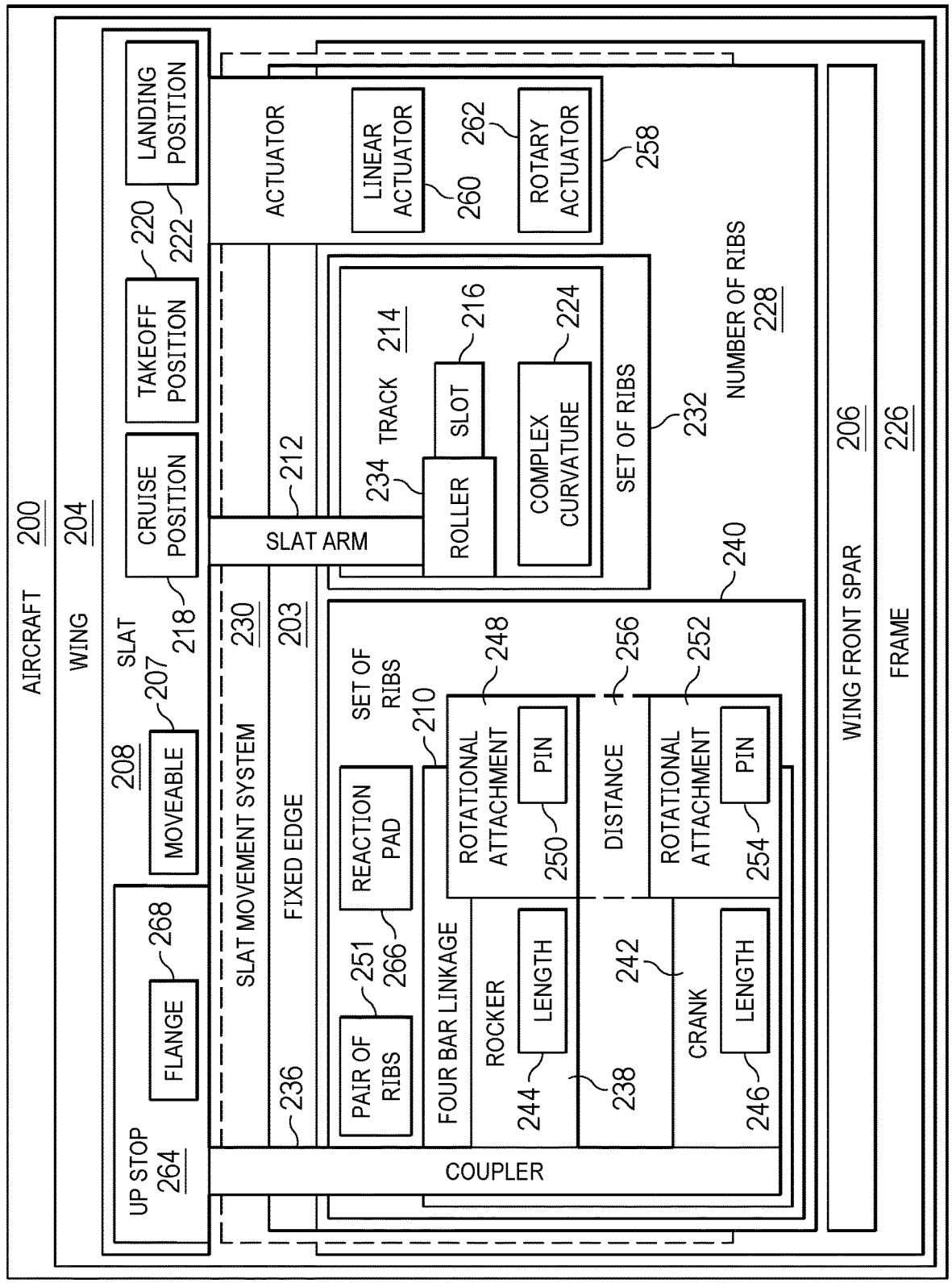
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 100 of FIG. 1 is an example of a physical implementation of aircraft 200. Aircraft 200 comprises wing 204 having fixed edge 203 and wing front spar 206, and moveable 207 slat 208 connected to wing 204 by four bar linkage 210 and slat arm 212. Slat arm 212 is movable along track 214 comprising slot 216 terminating prior to wing front spar 206. Track 214 allows the angle of slat 208 to be adjusted throughout the mechanism stroke. Track 214 allows for the angle of slat 208 to be optimized for aerodynamic performance at predetermined slat positions, such as cruise position 218, takeoff position 220, and landing position 222. In some illustrative examples, predetermined slat positions can include other positions in addition to or instead of cruise position 218, takeoff position 220, and landing position 222.

By slot 216 terminating prior to wing front spar 206, wing front spar 206 is not modified to accommodate track 214. Slot 216 terminating prior to wing front spar 206 can reduce a quantity of components in wing 204. Slot 216 terminating prior to wing front spar 206 can reduce the weight of wing 204 by reducing reinforcements for either load or fluid tightness of wing front spar 206.

Track 214 directs slat 208 between cruise position 218, a takeoff position 220, and a landing position 222. In some illustrative examples, track 214 has complex curvature 224. Complex curvature 224 enables track 214 to direct movement of slat 208.

Wing front spar 206 is a component of frame 226 of wing 204. Frame 226 further comprises number of ribs 228 within wing 204 and provides structural support to wing 204. Components of slat movement system 230 can be mounted to one or more ribs of number of ribs 228.

In some illustrative examples, track 214 is slot 216 secured to set of ribs 232 of the number of ribs 228. As used herein, a set of items is one or more items. For example, set of ribs 232 comprises one or more ribs of number of ribs 228. Slat arm 212 is movably connected to track 214 by roller 234 within slot 216. Roller 234 moves along slot 216 to slat 208 between cruise position 218, takeoff position 220, and landing position 222.

Four bar linkage 210 comprises coupler 236 connected to slat 208, rocker 238 rotationally connected to coupler 236 and to set of ribs 240, and crank 242 rotationally connected to coupler 236 and to set of ribs 240. Rocker 238 has length 244. Crank 242 has length 246. Length 244 of rocker 238 is longer than length 246 of crank 242.

Rocker 238 of four bar linkage 210 is connected to set of ribs 240 by rotational attachment 248. In some illustrative examples, rotational attachment 248 comprises pin 250. In some illustrative examples, set of ribs 240 takes the form of pair of ribs 251 and pin 250 is positioned between pair of ribs 251. In these illustrative examples, rocker 238 is positioned between pair of ribs 251.

Crank 242 of four bar linkage 210 is connected to set of ribs 240 by rotational attachment 252. In some illustrative examples, rotational attachment 252 comprises pin 254. In some illustrative examples, when set of ribs 240 takes the form of pair of ribs 251, pin 254 is positioned between pair of ribs 251. In these illustrative examples, crank 242 is positioned between pair of ribs 251.

In some illustrative examples, set of ribs 240 is separate from set of ribs 232. In some illustrative examples, set of ribs 240 has at least one rib in common with set of ribs 232.

Rocker 238 and crank 242 are rotationally connected to coupler 236. Rocker 238 is connected to coupler 236 at a position closer to slat 208 than a connection of crank 242 to coupler 236.

In some illustrative examples, distance 256 between rotational attachment 248 of rocker 238 to set of ribs 240 and rotational attachment 252 between crank 242 and set of ribs 251 is shorter than length 244 of rocker 238. In some illustrative examples, rocker 238 is connected to set of ribs 240 by rotational attachment 248 closer to fixed edge 203 than rotational attachment 252 between crank 242 and set of ribs 240.

In some illustrative examples, actuator 258 is connected to slat 208 and is configured to drive slat 208 relative to fixed edge 203 of wing 204. Actuator 258 takes any desirable form. In some illustrative examples, actuator 258 takes the form of one of linear actuator 260 or rotary actuator 262. In some illustrative examples, actuator 258 takes the form of linear actuator 260 when wing 204 has a limited height.

In some illustrative examples, slat 208 comprises up stop 264 configured to rest on reaction pad 266 of set of ribs 240 of wing 204 and configured to transfer loads from slat 208 to set of ribs 240 in cruise position 218. In some illustrative examples, up stop 264 comprises flange 268 configured to rest on reaction pad 266.

Presence of up stop 264 and reaction pad 266 in slat movement system 230 reduces the loads in four bar linkage 210 in cruise position 218. By reducing the loads transferred into four bar linkage 210, connections between at least one of coupler 236 and slat 208, rocker 238 and coupler 236, or crank 242 and coupler 236 can be created using at least one of a smaller, thinner, or less expensive pin or other attachment.

The illustration of aircraft 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, more than one four bar linkage can be present in slat movement system 230. In some illustrative examples, four bar linkage 210 and a second four bar linkage are both used to move slat 208. Additionally, although only one slat, slat 208, is depicted, any desirable quantity of slats can be associated with wing 204. In these illustrative examples, a second four bar linkage and a second slat arm are connected to slat 208 and wing 204, the second slat arm movable along a second track terminating prior to wing front spar 206.

Figure 3:
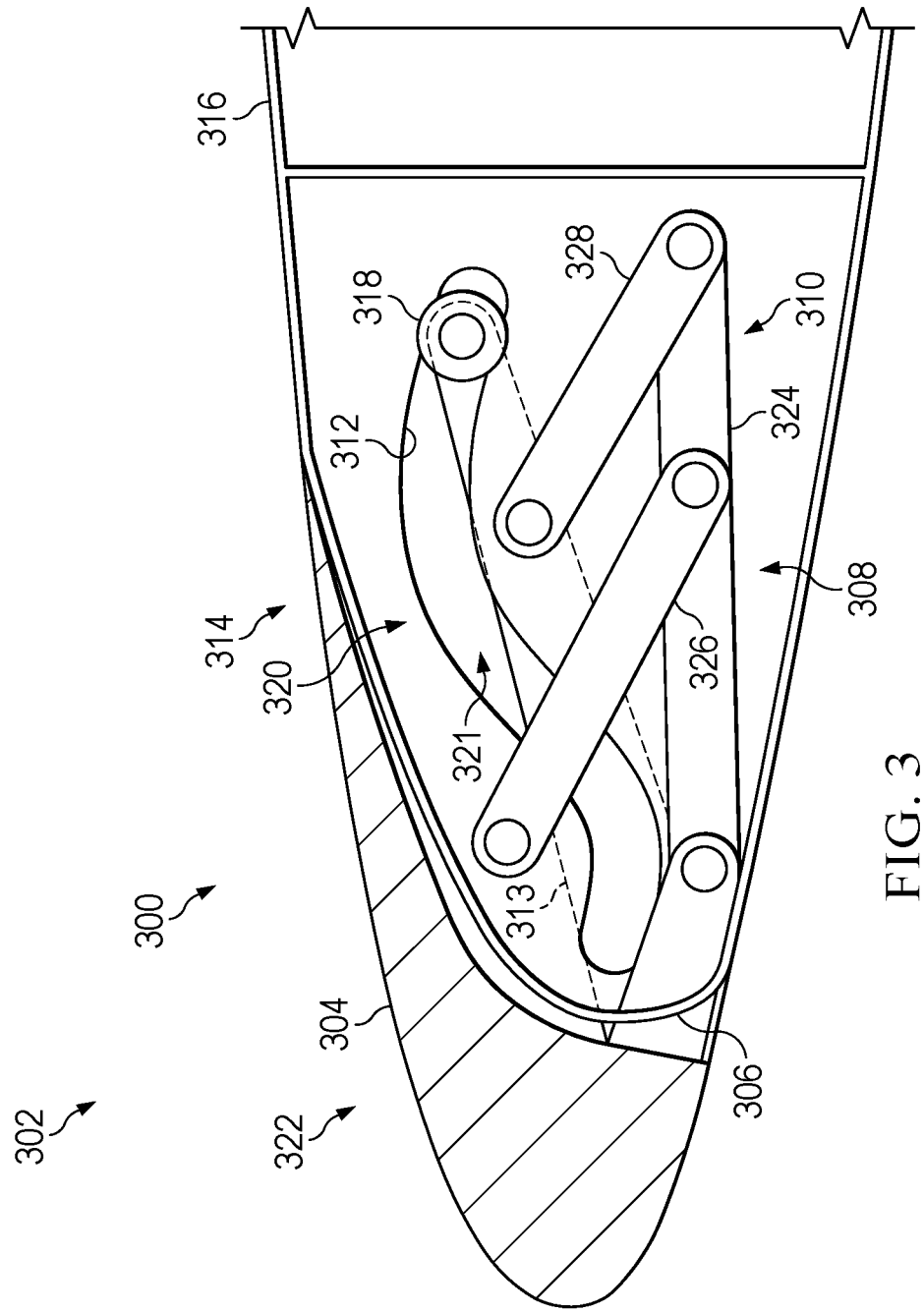
FIG. 3 is an illustration of a side view of a slat movement system of a wing in a cruise position in accordance with an illustrative embodiment.
Figure 4:
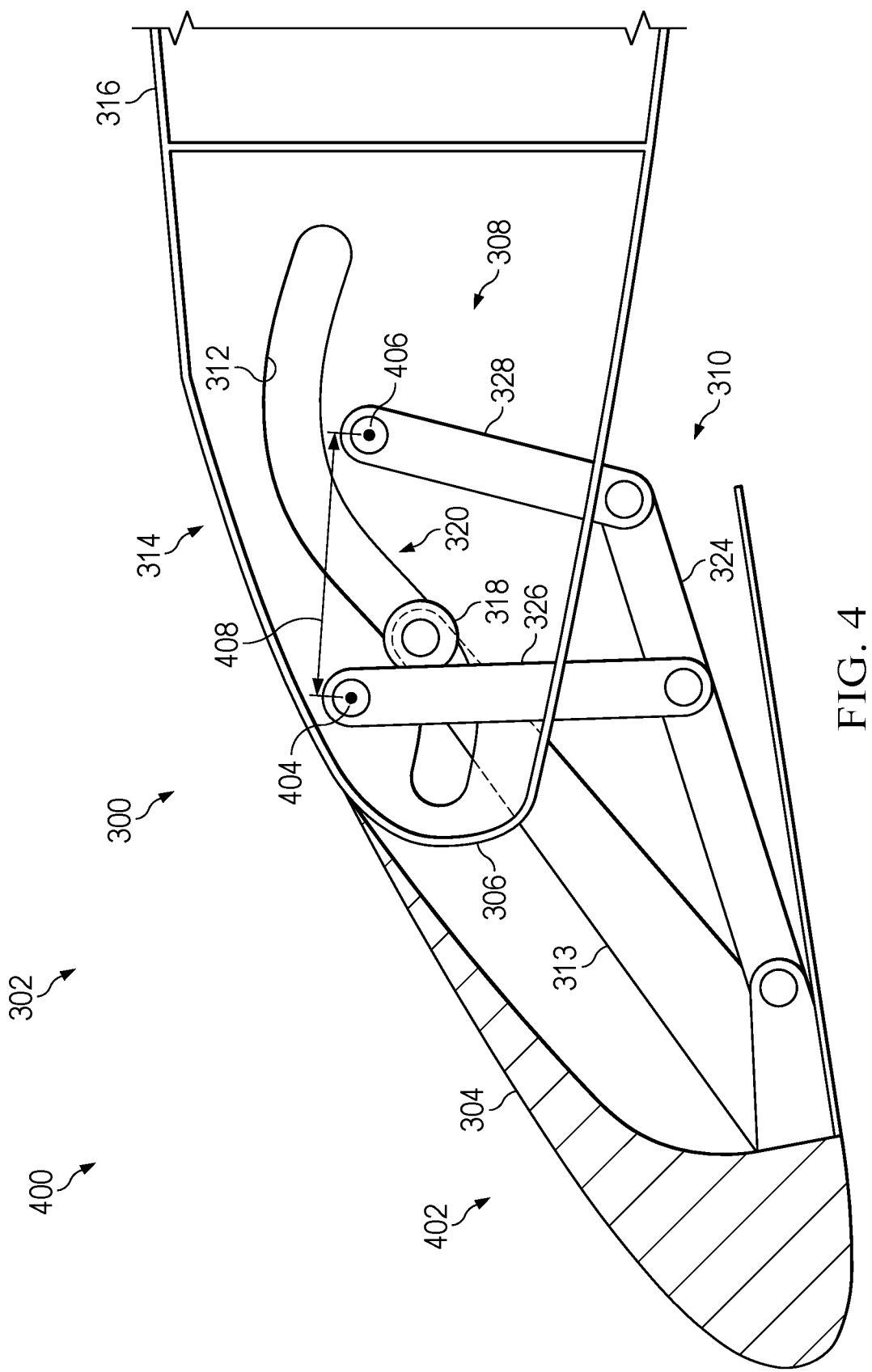
FIG. 4 is an illustration of a side view of a slat movement system of a wing in a takeoff position in accordance with an illustrative embodiment.
Figure 5:
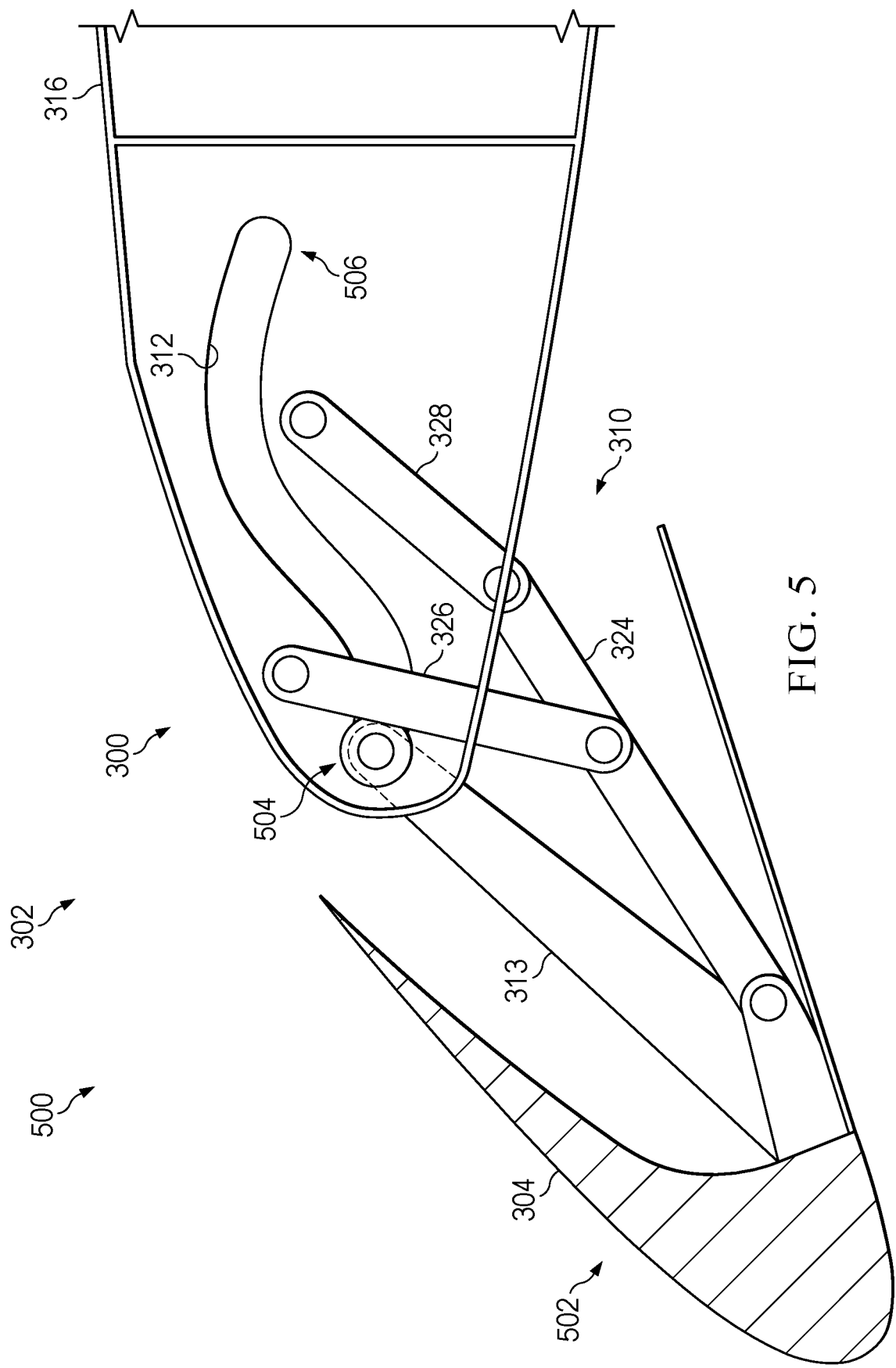
FIG. 5 is an illustration of a side view of a slat movement system of a wing in a landing position in accordance with an illustrative embodiment.

Turning now to FIGS. 3-5, illustrations of side views of a slat movement system of a wing in a variety of different positions are depicted. There are several different intermediate positions that the slat movement system will go through to move between the positions depicted in FIGS. 3-5.

Turning now to FIG. 3, an illustration of a side view of a slat movement system of a wing in a cruise position is depicted in accordance with an illustrative embodiment. Wing 300 of aircraft 302 has slat 304 movable relative to fixed edge 306 of wing 300. Slat 304 is movable relative to fixed edge 306 by slat movement system 308.

Slat movement system 308 comprises four bar linkage 310, track 312, and slat arm 313. Four bar linkage 310 is connected to slat 304 and set of ribs 314. Track 312 comprises slot 321 contained between fixed edge 306 and wing front spar 316 in wing 300. Slot 321 terminates prior to wing front spar 316. By terminating prior to wing front spar 316, cuts are not made into wing front spar 316 to accommodate track 312.

Slat arm 313 is movably connected to track 312 by roller 318 in slot 321. Slat arm 313 is mounted to slat 304. Movement of roller 318 of slat arm 313 in track 312, directs the position of slat 304.

As depicted, track 312 has complex curvature 320. Complex curvature 320 allows for movement of slat 304 through cruise position 322, takeoff position 402 of FIG. 4, and landing position 502 of FIG. 5.

Four bar linkage 310 comprises coupler 324 connected to slat 304, rocker 326, and crank 328. Rocker 326 is rotationally connected to coupler 324 and to set of ribs 314. Crank 328 is rotationally connected to coupler 324 and to set of ribs 314. As depicted, rocker 326 is longer than crank 328.

Although not depicted for ease of illustration, an actuator is present in slat movement system 308. In this illustrative example, the actuator takes the form of a rotary actuator.

Turning now to FIG. 4, an illustration of a side view of a slat movement system of a wing in a takeoff position is depicted in accordance with an illustrative embodiment. View 400 is a view of slat movement system 308 with slat 304 in takeoff position 402.

Slat arm 313 has moved within track 312 to direct movement of slat 304. In takeoff position 402, there is no observable gap between slat 304 and fixed edge 306. In view 400, slat arm 313 is within the length of track 312. Slat arm 313 is between the two termination points of track 312.

Rocker 326 of four bar linkage 310 is connected to set of ribs 314 by rotational attachment 404. In some illustrative examples, rotational attachment 404 comprises a pin. In some illustrative examples, set of ribs 314 takes the form of a pair of ribs and a pin positioned between the pair of ribs. In these illustrative examples, rocker 326 is positioned between the pair of ribs.

Crank 328 of four bar linkage 310 is connected to set of ribs 314 by rotational attachment 406. In some illustrative examples, rotational attachment 406 comprises a pin. In this illustrative example, rocker 326 is connected to set of ribs 314 by rotational attachment 404 closer to fixed edge 306 than rotational attachment 406 between crank 328 and set of ribs 314.

Distance 408 between rotational attachment 404 of rocker 326 to set of ribs 314 and rotational attachment 406 between crank 328 and set of ribs 314 is shorter than rocker 326. In this illustrative example, distance 408 is also shorter than crank 328.

Turning now to FIG. 5, an illustration of a side view of a slat movement system of a wing in a landing position is depicted in accordance with an illustrative embodiment. View 500 is a view of slat movement system 308 with slat 304 in landing position 502. In view 500, slat arm 313 has moved to first end 504 of track 312. First end 504 provides a termination point of track 312. First end 504 positions slat arm 313 to maintain slat 304 in landing position 502.

Track 312 also has second end 506. Second end 506 of track 312 occurs prior to wing front spar 316. In some illustrative examples, when slat 304 is in cruise position 322 of FIG. 3, slat arm 313 can be at second end 506 of track 312.

Figure 6:
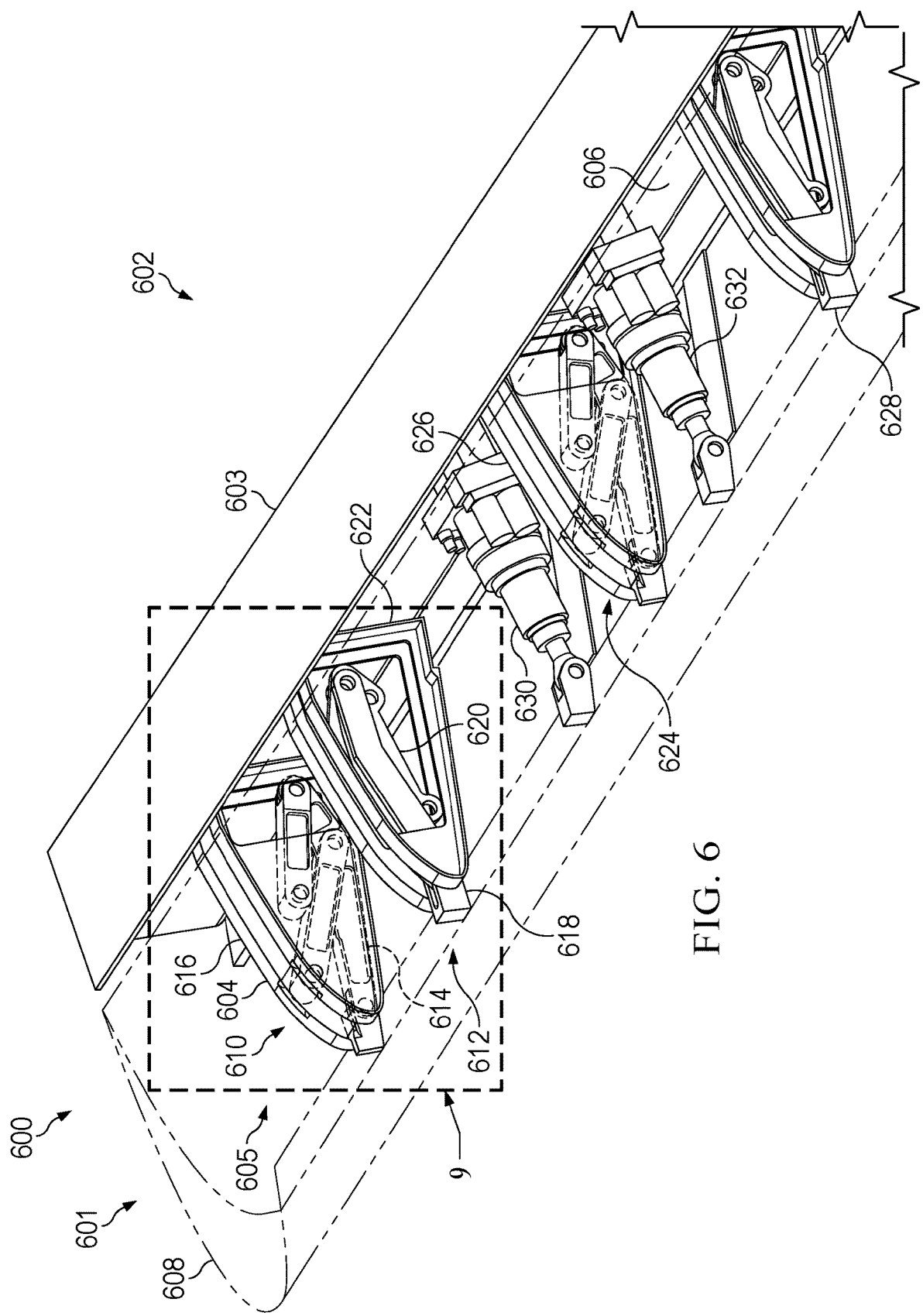
FIG. 6 is an illustration of an isometric view of a wing with a slat movement system in a cruise position in accordance with an illustrative embodiment.
Figure 7:
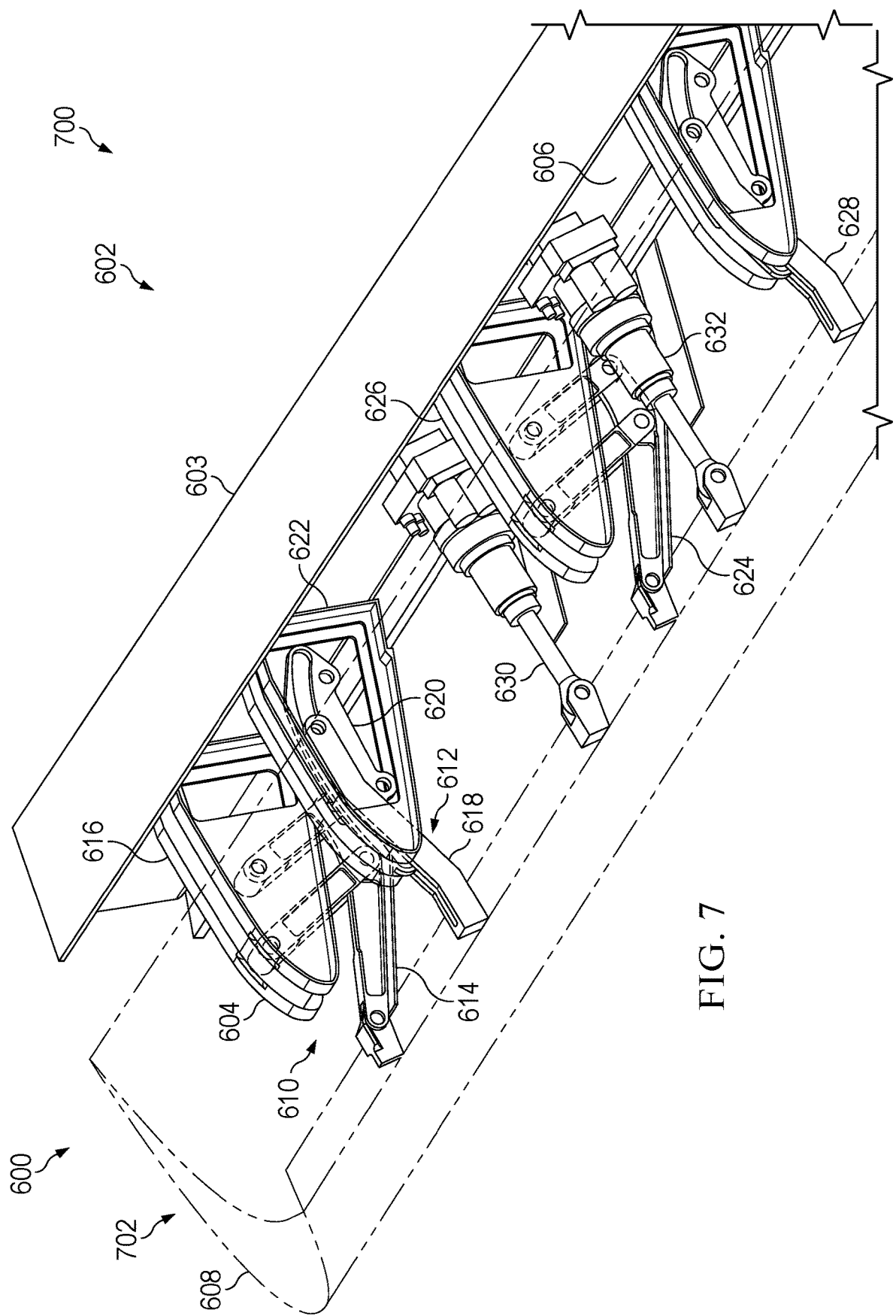
FIG. 7 is an illustration of an isometric view of a wing with a slat movement system in a takeoff position in accordance with an illustrative embodiment.
Figure 8:
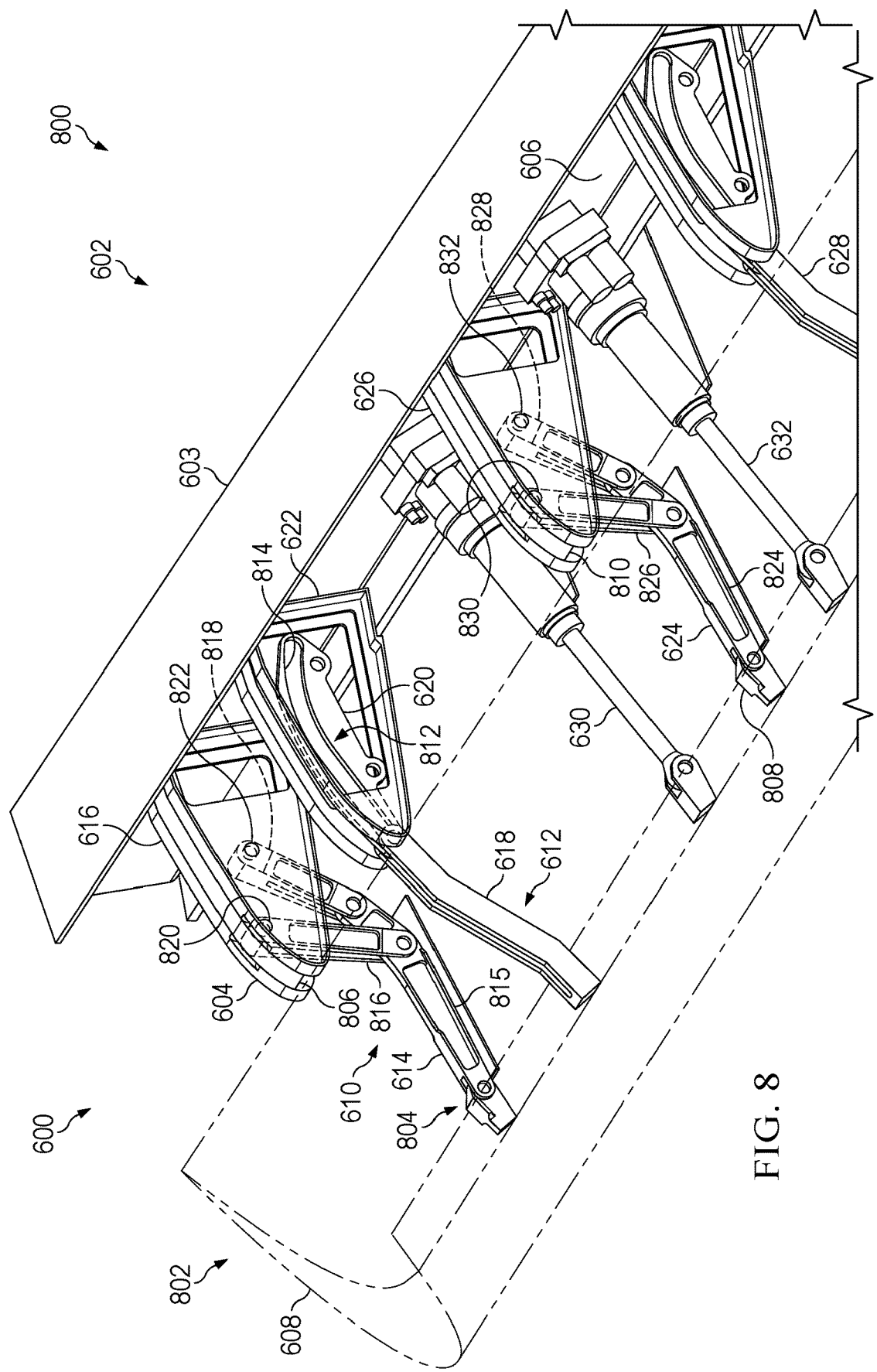
FIG. 8 is an illustration of an isometric view of a wing with a slat movement system in a landing position in accordance with an illustrative embodiment.

Turning now to FIGS. 6-8, illustrations of isometric views of a slat movement system of a wing in a variety of different positions are depicted. There are several different intermediate positions that the slat movement system will go through to move between the positions depicted in FIGS. 6-8.

Turning now to FIG. 6, an illustration of an isometric view of a wing with a slat movement system in a cruise position is depicted in accordance with an illustrative embodiment. Wing 600 is in cruise position 601. Wing 600 of aircraft 602 is a physical implementation of wing 204 of FIG. 2. Wing 600 has slat movement system 605 for moving slat 608 relative to fixed components of wing 600. Wing 600 comprises a fixed edge (removed for visibility), frame 603 comprising number of ribs 604 and wing front spar 606, slat 608 movable relative to the fixed edge, plurality of four bar linkages 610 connecting slat 608 to frame 603 of wing 600, and plurality of slat arms 612 connected to slat 608. Each of plurality of slat arms 612 is attached by a roller to a respective track having a complex curvature, each track connected to frame 603, and each track terminating prior to wing front spar 606.

Plurality of four bar linkages 610 comprises four bar linkage 614 and four bar linkage 624. As depicted, four bar linkage 614 is connected to set of ribs 616. Set of ribs 616 are a portion of number of ribs 604 of frame 603. Number of ribs 604 is within wing 600 and provides structural support to wing 600. Four bar linkage 624 is connected to set of ribs 626. Set of ribs 616 are a portion of number of ribs 604 of frame 603.

As depicted, each of plurality of four bar linkages 610 comprises a coupler connected to the slat, a rocker rotationally connected to the coupler and to a respective set of ribs of the frame of the wing, and a crank rotationally connected to the coupler and to the respective set of ribs, the rocker longer than the crank. In both four bar linkage 614 and four bar linkage 624, a distance between a rotational attachment of the rocker to the respective set of ribs and a rotational attachment between the crank and the respective set of ribs is shorter than the rocker. In both four bar linkage 614 and four bar linkage 624, the rocker is connected to the respective set of ribs by a rotational attachment closer to the fixed edge than a rotational attachment between the crank and the respective set of ribs.

Plurality of slat arms 612 include slat arm 618 and slat arm 628. plurality of slat arms 612 are connected to frame 603 by being joined to number of ribs 604. More specifically, slat arm 618 is movable relative to track 620. Track 620 is joined to set of ribs 622 of number of ribs 604. Slat arm 628 is movable relative to a track (not depicted) that is joined to an additional set of ribs of number of ribs 604.

As depicted, slat 608 is connected to wing 600 by four bar linkage and slat arm, four bar linkage 614 and slat arm 618. Slat arm 618 is movable along track 620 comprising a slot (not visible) terminating prior to wing front spar 606. Slat 608 is also connected to a second four bar linkage and a second slat arm, four bar linkage 624 and slat arm 628, the second slat arm movable along a second track (not depicted) terminating prior to the wing front spar.

Turning now to FIG. 7, an illustration of an isometric view of a wing with a slat movement system in a takeoff position is depicted in accordance with an illustrative embodiment. In view 700, slat 608 has been moved to takeoff position 702. In view 700, actuator 630 and actuator 632 have driven slat 608 while plurality of four bar linkages 610 and plurality of slat arms 612 control the position of slat 608.

Turning now to FIG. 8, an illustration of an isometric view of a wing with a slat movement system in a landing position is depicted in accordance with an illustrative embodiment. In view 800, slat 608 in landing position 802.

In view 800, components of plurality of four bar linkages 610, number of ribs 604, and track 620 are more easily visible. For example, up stop 804 on slat 608 is more visible. Set of ribs 616 comprises reaction pad 806 configured to support up stop 804 of slat 608 and transfer loads from slat 608 to set of ribs 616. Up stop 804 is a ledge configured to rest on reaction pad 806 of set of ribs 616 when slat 608 is in cruise position 601 of FIG. 6. Up stop 804 transfers loads from slat 608 into set of ribs 616 instead of into four bar linkage 614.

In view 800, up stop 808 on slat 608 and reaction pad 810 are more visible. Set of ribs 626 comprises reaction pad 810 configured to support up stop 808 of slat 608 and transfer loads from slat 608 to set of ribs 626. Up stop 808 is a ledge configured to rest on reaction pad 810 of set of ribs 626 when slat 608 is in cruise position 601 of FIG. 6. Up stop 808 transfers loads from slat 608 into set of ribs 626 instead of into four bar linkage 624.

The presence of up stop 804, reaction pad 806, up stop 808, and reaction pad 810 lowers loads on plurality of four bar linkages 610. Due to lowered loads on plurality of four bar linkages 610, connections for plurality of four bar linkages 610 can be at least one of smaller or lighter.

Complex curvature 812 of slot 814 in track 620 is also more easily visible in view 800. As can be seen in view 800, at landing position 802, slot 814 provides a stop for slat arm 618. As can be seen in view 800, complex curvature 812 of slot 814 is different from complex curvature 320 of slot 321 in FIG. 3. Complex curvature 812 can be set based on at least one of a desired position of a slat, a size of a slat, a shape of a slat, or a type of actuator.

As can be seen in view 800, four bar linkage 614 comprises coupler 815 connected to slat 608, rocker 816 rotationally connected to coupler 815 and to set of ribs 616 of frame 603 of wing 600, and crank 818 rotationally connected to coupler 815 and to set of ribs 616. In this illustrative example, rocker 816 is longer than crank 818. In four bar linkage 614, a distance between rotational attachment 820 of rocker 816 to set of ribs 616 and rotational attachment 822 between crank 818 and set of ribs 616 is shorter than rocker 816. In four bar linkage 614, rocker 816 is connected to set of ribs 616 by rotational attachment 820 closer to a fixed edge (not depicted) than rotational attachment 822 between crank 818 and set of ribs 616.

As can be seen in view 800, four bar linkage 624 comprises coupler 824 connected to slat 608, rocker 826 rotationally connected to coupler 824 and to set of ribs 626 of frame 603 of wing 600, and crank 828 rotationally connected to coupler 824 and to set of ribs 626. In this illustrative example, rocker 826 is longer than crank 828. In four bar linkage 624, a distance between rotational attachment 830 of rocker 826 to set of ribs 626 and rotational attachment 832 between crank 828 and set of ribs 626 is shorter than rocker 826. In four bar linkage 624, rocker 826 is connected to set of ribs 626 by rotational attachment 830 closer to a fixed edge (not depicted) than rotational attachment 832 between crank 828 and set of ribs 626.

Figure 9:
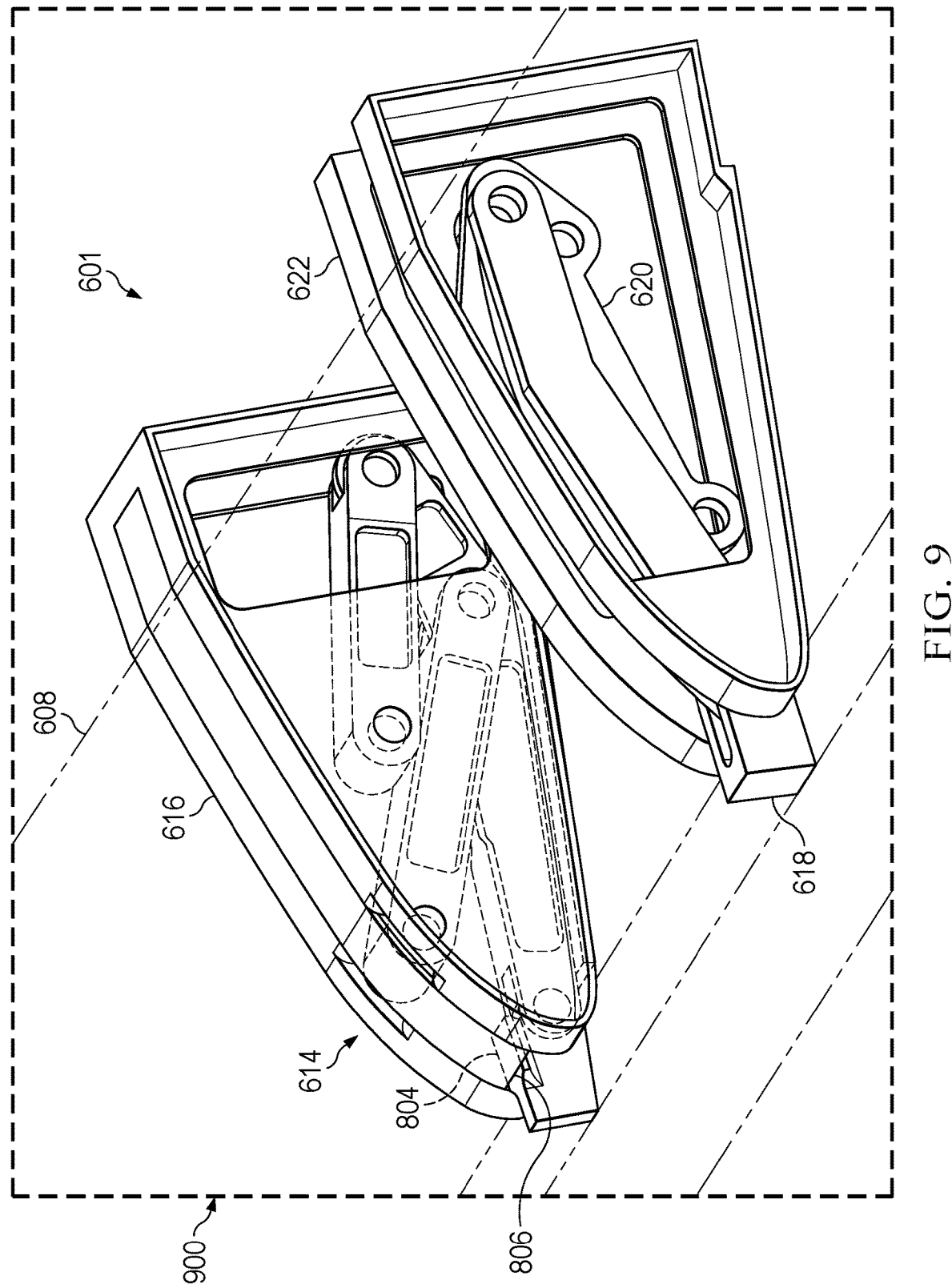
FIG. 9 is an illustration of an isometric view of a portion of a slat movement system in a cruise position in accordance with an illustrative embodiment.

Turning now to FIG. 9, an illustration of an isometric view of a portion of a slat movement system in a cruise position is depicted in accordance with an illustrative embodiment. View 900 is a view of four bar linkage 614 and slat arm 618 in cruise position 601.

Figure 10:
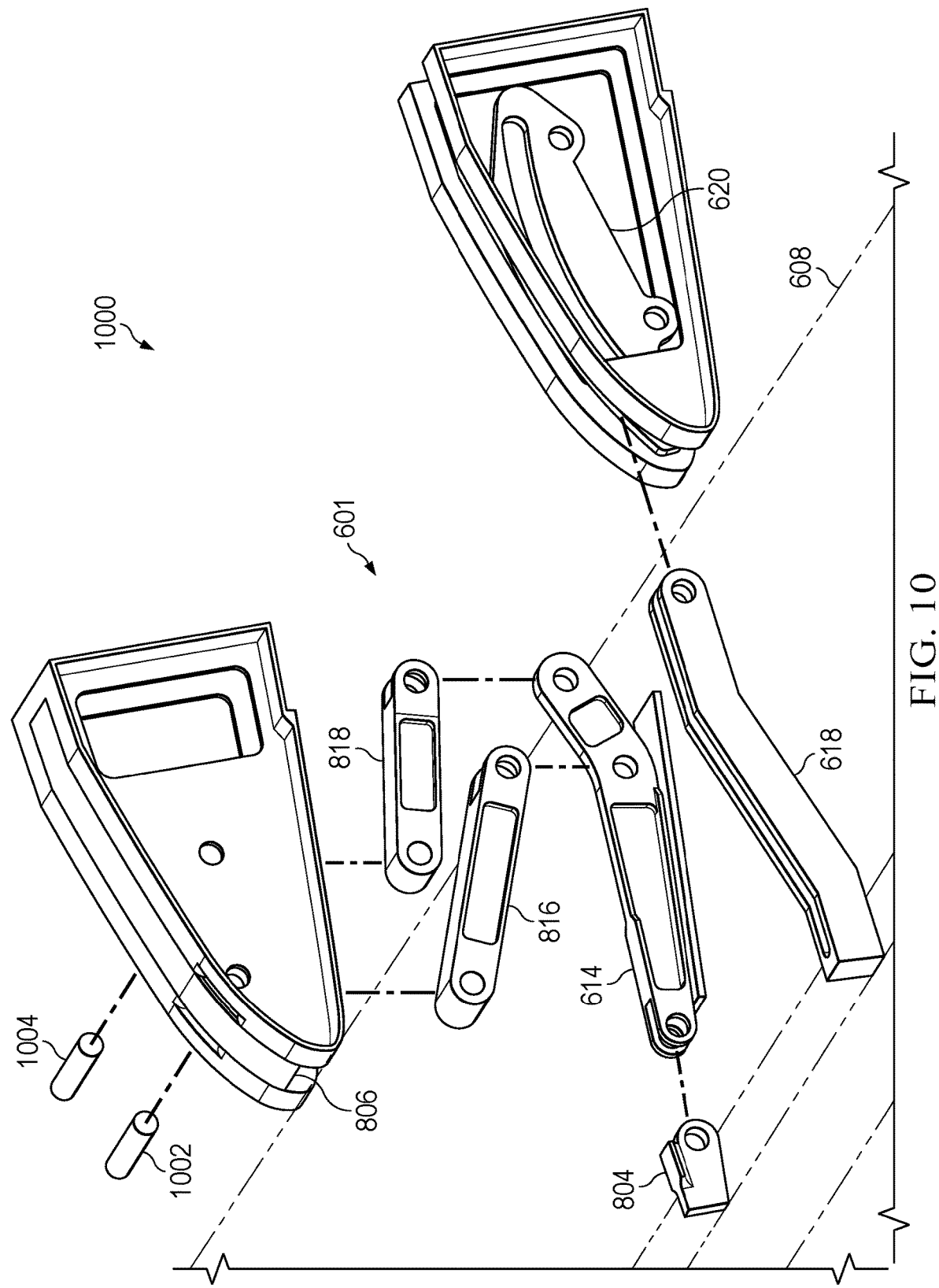
FIG. 10 is an illustration of an exploded view of a portion of a slat movement system in a cruise position in accordance with an illustrative embodiment.

Turning now to FIG. 10, an illustration of an exploded view of a portion of a slat movement system in a cruise position is depicted in accordance with an illustrative embodiment. View 1000 is an exploded view of four bar linkage 614, set of ribs 616, slat arm 618, and set of ribs 622. View 1000 is an exploded view of the components from FIG. 9. In view 1000, pins to form rotational attachments of four bar linkage 614, such as pin 1002 and pin 1004, are depicted.

Figure 11:
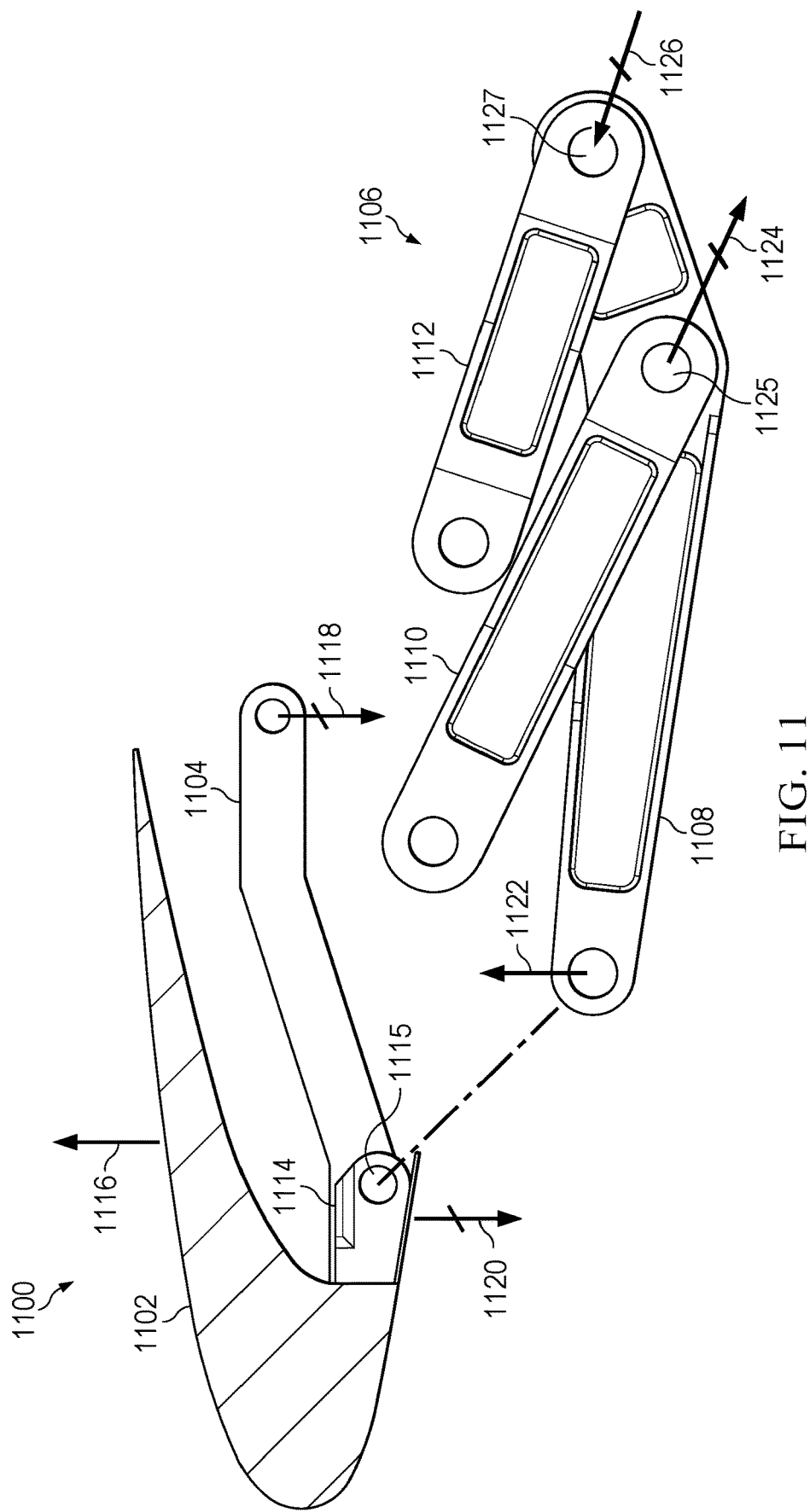
FIG. 11 is an illustration of a side view of a portion of a slat movement system with force indicators for a cruise position in accordance with an illustrative embodiment.

Turning now to FIG. 11, an illustration of a side view of a portion of a slat movement system with force indicators for a cruise position is depicted in accordance with an illustrative embodiment. Slat movement system 1100 is a physical implementation of portions of slat movement system 230 of FIG. 2. In some illustrative examples, slat movement system 1100 is the same as slat movement system 308 of FIGS. 3-5. In some illustrative examples, slat movement system 1100 is the same as slat movement system 605 of FIGS. 6-10.

Slat 1102 is connected to slat arm 1104 and four bar linkage 1106. Four bar linkage 1106 comprises coupler 1108, rocker 1110, and crank 1112. In this illustrative example, slat 1102 has up stop 1114. Up stop 1114 will reduce forces transferred from slat 1102 to four bar linkage 1106.

Without up stop 1114, force would transfer from slat 1102 through rotational connection 1115 to four bar linkage 1106. Without up stop 1114, forces through four bar linkage 1106 would be more than 10 times greater than experienced with up stop 1114. In some illustrative examples, without up stop 1114, forces through four bar linkage 1106 would be almost 40 times greater than experienced with up stop 1114.

Force 1116 on slat 1102 is unchanged by the presence of up stop 1114. Force 1118 on slat arm 1104 is increased by the presence of up stop 1114. Force 1120 is slightly less than a force on rotational connection 1115 without the presence of up stop 1114.

Force 1122 on the connection between coupler 1108 and slat 1102, force 1124 on connection 1125 between rocker 1110 and coupler 1108, and force 1126 on connection 1127 between crank 1112 and coupler 1108. Reaction loads through four bar linkage are stabilizing loads. The stabilizing loads are substantially smaller than loads without the presence of up stop 1114.

Figure 12:
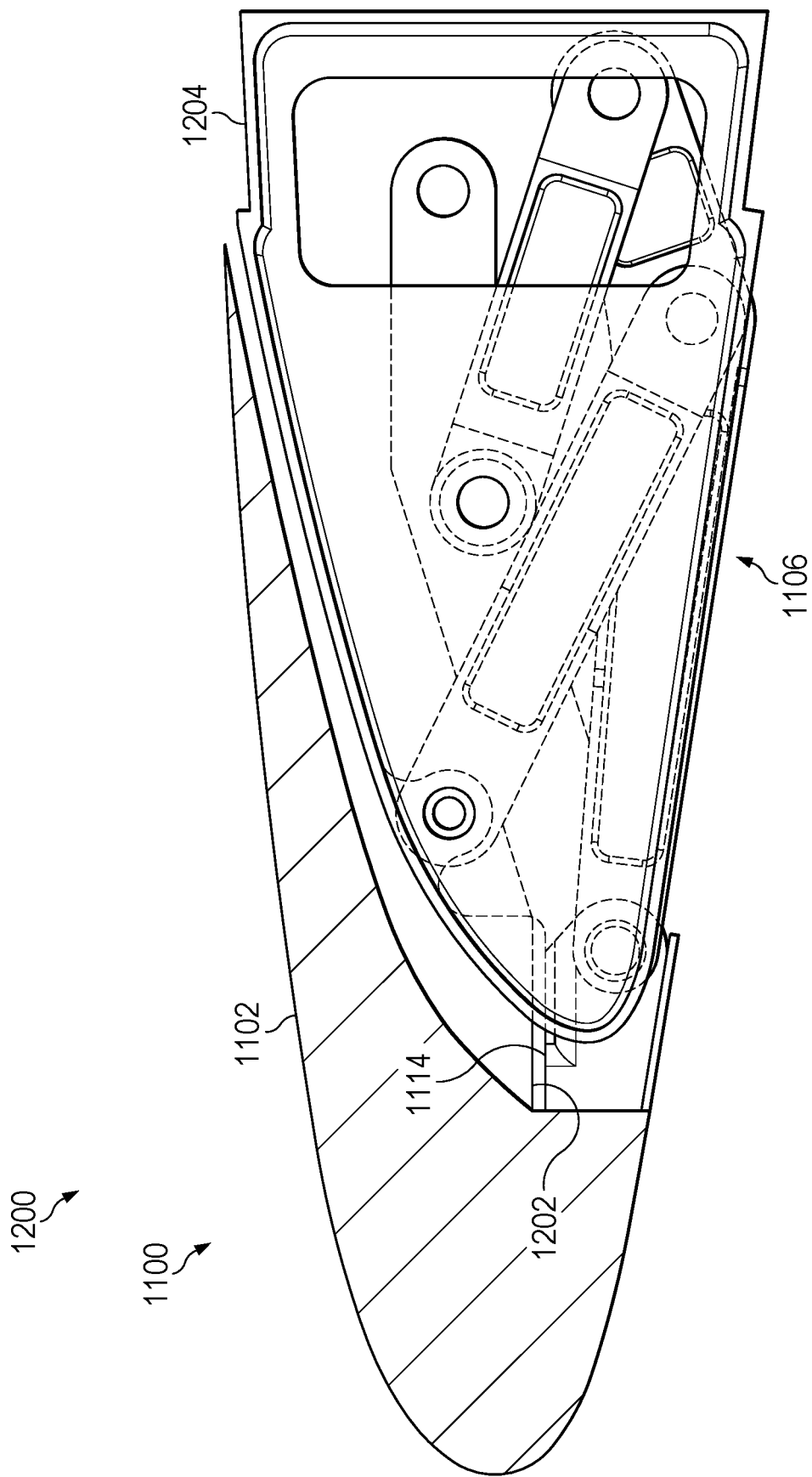
FIG. 12 is an illustration of a side view of a portion of a slat movement system in a cruise position in accordance with an illustrative embodiment.

Turning now to FIG. 12, an illustration of a side view of a portion of a slat movement system in a cruise position is depicted in accordance with an illustrative embodiment. View 1200 is an assembled view of slat movement system 1100 of FIG. 11. In FIG. 11, slat movement system 1100 is in a cruise position. In cruise position, up stop 1114 is in contact with reaction pad 1202 of set of ribs 1204. In this illustrative example, up stop 1114 rests on reaction pad 1202 to transfer loads from slat 1102 to set of ribs 1204 during cruising of the aircraft.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional.

Figure 13:
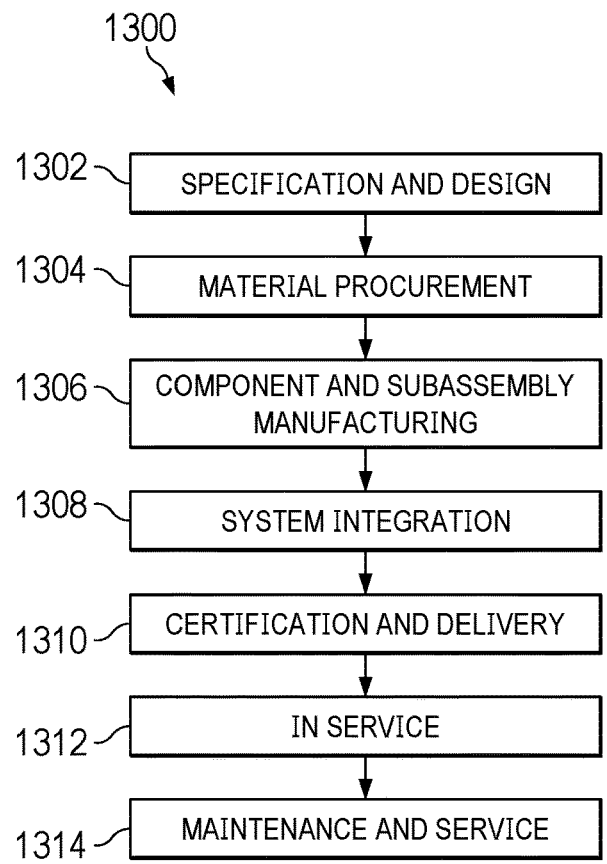
FIG. 13 is an illustration of an aircraft manufacturing and service method in a form of a block diagram in accordance with an illustrative embodiment.
Figure 14:
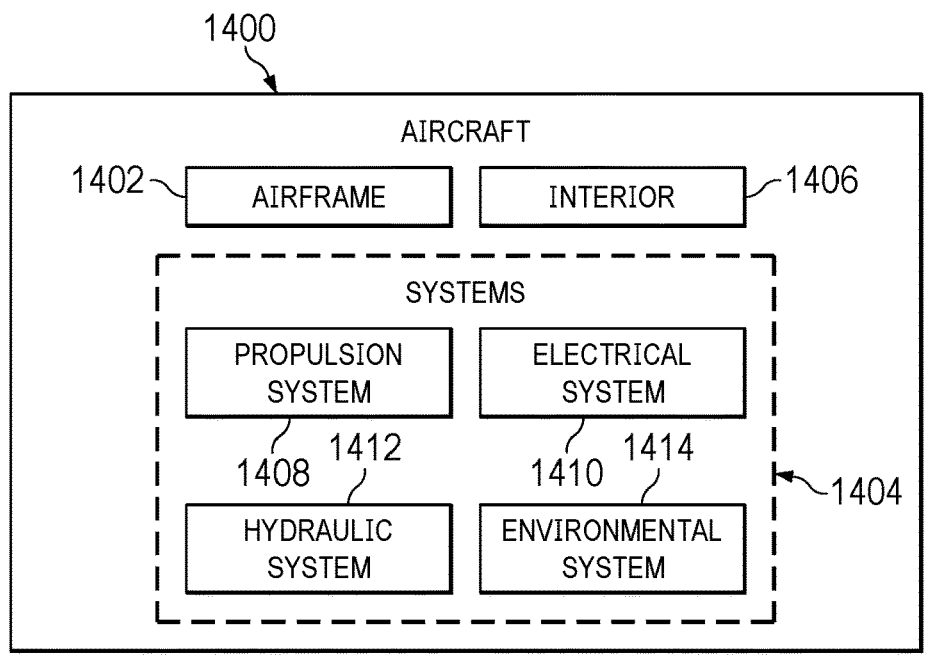
FIG. 14 is an illustration of an aircraft in a form of a block diagram in which an illustrative embodiment may be implemented.

Illustrative embodiments of the present disclosure may be described in the context of aircraft manufacturing and service method 1300 as shown in FIG. 13 and aircraft 1400 as shown in FIG. 14. Turning first to FIG. 13, an illustration of an aircraft manufacturing and service method in a form of a block diagram is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, or other maintenance and service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft in a form of a block diagram is depicted in which an illustrative embodiment may be implemented. In this example, aircraft 1400 is produced by aircraft manufacturing and service method 1300 of FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included.

Apparatuses and methods embodied herein may be employed during at least one of the stages of aircraft manufacturing and service method 1300. One or more illustrative embodiments may be manufactured or used during at least one of component and subassembly manufacturing 1306, system integration 1308, in service 1312, or maintenance and service 1314 of FIG. 13.

The illustrative examples utilize the combination of a four bar linkage and a track and roller system to move a slat of an aircraft wing. The four bar linkage replaces a traditional slat track which typically utilizes penetrations through the wing front spar.

The elimination of a wing front spar penetrating track enables removal of the track can, which drives additional cost, weight, and assembly time. Furthermore, by eliminating the holes in the front wing spar generated by a longer track sweep, spar integrity is preserved. A front wing spar is a more efficient structural member without holes, thus enabling additional weight savings.

The illustrative examples can utilize at least one of a geared rotary actuator (GRA) driven mechanism or a linear actuator. The illustrative examples can provide a sealed takeoff position for the slat. The illustrative examples can eliminate a track can and drain fittings due to the elimination of cutting through the front wing spar. The illustrative examples can provide at least one of reduced cost, reduced weight, or reduced drag due to the components present in the wing. The illustrative examples can result in reduced in-tank work due to the track terminating prior to the front wing spar.

The illustrative examples provide for the use of an up stop. When an up stop is utilized, reaction loads through the four bar linkage are stabilizing loads and smaller than without the up stop.

The use of the up stop results in reduced mechanism loads, improved mechanism stiffness, reduced weight, and reduced cost. The use of the up stop can also result in improved airplane performance.

The illustrative examples enable a powerful high lift slat to be deployed from a wing without penetrating the wing front spar structure. The combination of the shortened track with a complex curvature and the four track linkage recreates the kinematic motion of a longer track without the extended integration space.

An up stop feature which is rigged for contact during cruise, provides a viable load path when the driving linkage is in a position of poor mechanical advantage. This load path enables the mechanism loads to be greatly reduced and provide greater stiffness and stability of the mechanism.

The illustrative examples provide a way to greatly reduce loads in a linkage when it is folded up for cruise and has poor mechanical advantage.

Utilizing the existing linkage load path to react loads could result in very high loads which could result in larger parts. Utilizing the up stop provides for smaller parts, better stiffness, and better fit of the slat to the wing.

The illustrative examples provide an up stop which is driven into a reaction pad during retraction so that the up stop nominally reacts air loads during every flight. The up stop provides a better mechanical advantage for reacting slat air loads and greater stability/stiffness. The illustrative examples can utilize an up stop as a nominal load path to help reduce the loads on the entire system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft that comprises:
   a wing that comprises a fixed edge and a wing front spar; and
   a slat moveably connected to the wing by a linkage and a slat arm, the slat arm movably connected within a track that comprises a slot that terminates prior to the wing front spar, wherein the linkage comprises:
   a coupler connected to the slat;
   a rocker rotationally connected to the coupler and to a set of ribs; and
   a crank rotationally connected to the coupler and to the set of ribs, wherein the rocker is longer than the crank.

2. The aircraft of claim 1 further comprising:
   an actuator connected to the slat and configured to drive the slat relative to the fixed edge of the wing.

3. The aircraft of claim 1, wherein the track comprises a shape that comprises curves.

4. The aircraft of claim 1, wherein the track directs the slat between a cruise position, a takeoff position, and a landing position.

5. The aircraft of claim 1, wherein the set of ribs are located between the wing front spar and the slat.

6. The aircraft of claim 1, wherein the track is a slot secured to the set of ribs.

7. The aircraft of claim 2, wherein the actuator connected to the slat is a linear actuator.

8. The aircraft of claim 7, wherein a distance between a rotational attachment of the rocker to the set of ribs and a rotational attachment between the crank and the set of ribs is shorter than the rocker.

9. The aircraft of claim 7, wherein the rocker is connected to the set of ribs by a rotational attachment closer to the fixed edge than a rotational attachment between the crank and the set of ribs.

10. The aircraft of claim 1 further comprising:
    a second linkage and a second slat arm connected to the slat and the wing, the second slat arm movably connected within a second track that terminates prior to the wing front spar.

11. The aircraft of claim 1, wherein the slat comprises an up stop configured to rest on a reaction pad of a set of ribs of the wing and configured to transfer loads from the slat to the set of ribs.

12. A slat movement system for a wing of an aircraft, wherein the slat movement system comprises:
    a linkage connected to a slat and to a set of ribs, wherein the linkage comprises:
    a coupler connected to the slat;
    a rocker rotationally connected to the coupler and to the set of ribs; and
    a crank rotationally connected to the coupler and to the set of ribs, wherein the rocker is longer than the crank;
    a track that comprises a slot contained between a fixed edge of the wing and a wing front spar in the wing; and
    a slat arm movably connected to the track by a roller within the slot.

13. The slat movement system of claim 12, wherein the slat is connected to a linear actuator.

14. The slat movement system of claim 13, wherein the rocker is connected to the set of ribs by a rotational attachment closer to the fixed edge than a rotational attachment between the crank and the set of ribs.

15. The slat movement system of claim 14, wherein the set of ribs comprises a pair of ribs, wherein a rotational attachment between the rocker and the set of ribs comprises a pin, and wherein a rotational attachment between the crank and the set of ribs is another pin.

16. The slat movement system of claim 12, wherein the slot comprises a shape that comprises curves.

17. The slat movement system of claim 12, wherein the track directs the slat between a cruise position, a takeoff position, and a landing position.

18. The slat movement system of claim 12, wherein the set of ribs comprises a reaction pad configured to support an up stop of the slat and transfer loads from the slat to the set of ribs.

19. A wing of an aircraft that comprises:
    a fixed edge;
    a frame of the wing comprising a number of ribs and a wing front spar;
    a slat movable relative to the fixed edge;
    a plurality of linkages connecting the slat to the frame of the wing, wherein each of the plurality of linkages comprises:
    a coupler connected to the slat;
    a rocker rotationally connected to the coupler and to a respective set of ribs of the frame of the wing; and
    a crank rotationally connected to the coupler and to the respective set of ribs, wherein the rocker is longer than the crank; and
    a plurality of slat arms connected to the slat, each of the plurality of slat arms attached by a roller to a respective track that comprises a shape that comprises curves, each track connected to the frame, each track terminating prior to the wing front spar.

20. The wing of the aircraft of claim 19, wherein the slat is connected to a linear actuator.

21. The wing of the aircraft of claim 20, wherein a distance between a rotational attachment of the rocker to the respective set of ribs and a rotational attachment between the crank and the respective set of ribs is shorter than the rocker.

22. The wing of the aircraft of claim 20, wherein the rocker is connected to the respective set of ribs by a rotational attachment closer to the fixed edge than a rotational attachment between the crank and the respective set of ribs.

* * * * *